J. P. ROHAN.
ELECTRIC FIXTURE CONNECTION.
APPLICATION FILED APR. 28, 1911.

1,016,777.

Patented Feb. 6, 1912.

Witnesses:
J. M. Strempfer
Ida M. Topliff

Inventor:
Joseph P. Rohan by
Harry R. Williams
atty.

UNITED STATES PATENT OFFICE.

JOSEPH P. ROHAN, OF HARTFORD, CONNECTICUT.

ELECTRIC-FIXTURE CONNECTION.

1,016,777. Specification of Letters Patent. Patented Feb. 6, 1912.

Application filed April 28, 1911. Serial No. 623,873.

*To all whom it may concern:*

Be it known that I, JOSEPH P. ROHAN, a citizen of the United States, residing at Hartford, in the county of Hartford and State of Connecticut, have invented a new and useful Improvement in Electric - Fixture Connections, of which the following is a specification.

It is customary, in fact it is recognized as practically necessary for safety, to connect combination chandeliers, electroliers and similar lighting fixtures with the gas or other supporting pipes by means of joints so constructed that the fixtures are electrically insulated from the supporting pipes.

This invention relates to those insulating joints which are interposed between such fixtures and their supports. The joints in most general use for this purpose have a socket or interiorly threaded nipple designed to be screwed onto the supporting pipe, and a stem or exteriorly threaded nipple onto which is screwed the coupling which is also screwed onto the end of the fixture pipe. The socket and stem are mechanically held together but electrically separated by suitable insulating material, and the coupling in the past has been made in the form of a yoke, that is, with two openings through its sides for the passage of the circuit wires that are run through the fixture. When the joint is provided with such a coupling, it is necessary to first screw the coupling upon the end of the fixture pipe with the wires extending straight out through the coupling, and then after the coupling is screwed in place, to double back the ends of the wires and thread them through the openings in the sides of the coupling. This is a slow operation, and when a large number of fixtures are being wired adds greatly to the expense. Furthermore, this bends the wires in such manner that they usually kink, and in straightening out the kink, frequently the exterior insulation is chafed and the interior conducting wire bared, resulting in a dangerous condition, and often the conducting wires are broken inside of the insulation, a fact that is not discovered until the fixtures are in place and ready to be put to use.

The object of this invention is to provide an insulating joint with a very simple and strong coupling which is so made that the circuit wires do not have to be doubled back and threaded through openings after the coupling is screwed upon the fixture pipe, but can be quickly turned down into the opening in the side of the coupling, without any possible danger of kinking them, chafing the insulation or breaking the conductors.

Figure 1:
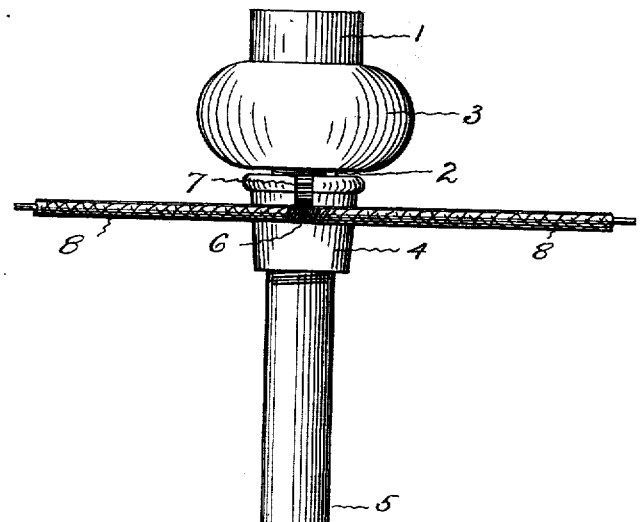
Figure 2:
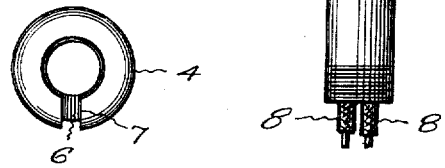
Figure 3:
Figure 4:
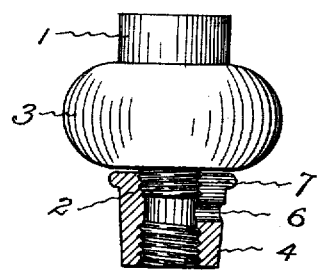

Figure 1 of the accompanying drawings shows a side elevation of an insulating joint an da coupling which embodies this invention attached to the end of the fixture pipe. Fig. 2 shows a plan of the coupling. Fig. 3 shows a front view of the coupling. Fig. 4 shows a side view of the joint and a section of the coupling attached thereto.

The socket 1 and the stem 2 are mechanically held together but electrically separated by the insulating body 3 in the manner common in this class of devices. The coupling 4 is screwed upon the end of the fixture pipe 5 and then is screwed upon the stem 2 of the joint. The coupling has an opening 6 made transversely through one side intermediate of the ends, and a slot 7 from the top down to this opening.

When the joint is to be attached to the fixture, the coupling is first screwed upon the upper end of the fixture pipe and then the wires 8, which have been run through the fixture pipe, are one at a time bent down through the slot 7 into the opening 6, after which the joint stem is screwed into the upper end of the coupling so as to join the parts and close the slot and lock the wires in the opening. This operation of getting the wires into the opening in the side of the coupling is exceedingly simple and can be very quickly performed. The wires are not liable to be kinked, and there is no possibility of injuring the insulation surrounding the conductors or breaking the conductors inside of the insulation.

The invention claimed is:

1. The combination of an insulating joint having a threaded stem, and a coupling screwed thereon, said coupling being formed in a single piece and provided with threads for attachment to the joint stem and threads for the attachment of a fixture pipe, and having a wire opening that extends through one side from the top down, said joint stem when the coupling is screwed thereon closing the upper part of said wire opening.

2. The combination of an insulating joint having a threaded stem, and a coupling screwed thereon, said coupling being formed in a single piece and provided with threads for attachment to the joint stem, and threads for the attachment of a fixture pipe, and having a transverse wire opening in one side and a slot opening from the top down to said transverse opening, said wire opening being closed at the top by the stem when the joint and coupling are screwed together.

JOSEPH P. ROHAN.

Witnesses:
H. R. WILLIAMS,
J. M. STREMPFER.